US006595528B2

(12) United States Patent
Voss

(10) Patent No.: US 6,595,528 B2
(45) Date of Patent: Jul. 22, 2003

(54) CHUCK FOR THE CLAMPING OF TOOLS BY SHRINK FIT

(75) Inventor: Michael Voss, Leonberg (DE)

(73) Assignee: Bilz Werkzeugfabrik GmbH & Co. KG, Ostfidern (DE)

( * ) Notice: Subject to any disclaimer, the term of this patent is extended or adjusted under 35 U.S.C. 154(b) by 0 days.

(21) Appl. No.: 10/040,831

(22) Filed: Jan. 8, 2002

(65) Prior Publication Data
US 2002/0094250 A1 Jul. 18, 2002

(30) Foreign Application Priority Data
Jan. 10, 2001 (DE) .......................... 101 00 719

(51) Int. Cl.[7] .............................................. B23P 11/02
(52) U.S. Cl. ........................ 279/102; 29/447; 403/28; 403/30; 403/273; 409/234
(58) Field of Search ........................ 279/9.1, 102, 103; 29/96, 105, 447; 409/233, 234; 408/239 R, 146, 181; 403/28, 29, 30, 273

(56) References Cited

U.S. PATENT DOCUMENTS 4,021,051 A * 5/1977 Toyomoto et al. ........... 279/9.1
5,311,654 A     5/1994 Cook
5,582,494 A * 12/1996 Cook ......................... 409/234
6,071,219 A *  6/2000 Cook ............................ 483/1
6,315,506 B1 * 11/2001 Mizoguchi ................. 409/234

* cited by examiner

Primary Examiner—Steven C. Bishop
(74) Attorney, Agent, or Firm—Kenyon & Kenyon

(57) ABSTRACT

A chuck for the clamping of tools by shrink fit includes a chuck member which has a longitudinal section having a central receptacle with clamping surface for the insertion and holding of the tool to be clamped with its shank. The longitudinal section includes a plurality of segments arranged at distances from one another in the circumferential direction and separated from each other by clearances in between, the segments extending essentially axially parallel and forming the clamping surface with their inner peripheral areas. The segments are surrounded on the outside by a sleeve part. The segments are either in one piece with the sleeve part or, as separate structural elements, are a component of a mounted insert.

19 Claims, 2 Drawing Sheets

CHUCK FOR THE CLAMPING OF TOOLS BY SHRINK FIT

FIELD OF THE INVENTION

The present invention relates to a chuck for the clamping of tools by shrink fit.

BACKGROUND INFORMATION

A chuck of this type is described in U.S. Pat. No. 5,311,654. In these chucks, the chuck member has a longitudinal section with a central receptacle having a clamping surface for inserting and holding the tool to be clamped with its cylindrical shank. The receptacle is made of a central, axially relatively long-dimensioned bore hole which is in communication with a central channel in the remaining part of the chuck member, this bore hole being intended at the same time to be used for the passage of a lubricant and/or coolant, as well. For this purpose, introduced in the region of the central bore hole are four shallow longitudinal grooves, arranged at equal angular distances from each other in the circumferential direction, through which the lubricant and/or coolant is guided along the shank of the clamped tool to the front up to the freely projecting tool part. In this contraction chuck, to initiate the shrink clamping, the longitudinal section containing the central bore hole is heated from the outside, so that it expands radially under heating, with accompanying radial widening of the central bore hole which forms the clamping surface. Because of the relatively large material cross-section of the longitudinal section, it has only a relatively low expansion rate. The extent of the radial widening of the central bore hole is relatively small. This demands that the shanks of the tools to be clamped in this manner must be very exactly machined and dimensioned, in conformity with the widening capability of the central clamping bore hole of the chuck. The tolerances for the diameters of the tools are therefore very narrow. Depending on circumstances, the application time of the heat and/or the amount of heat when heating the longitudinal section of the chuck is relatively great for achieving the suitably sufficient widening. Following the heating and insertion of the tool, shrinkage of the longitudinal section of the chuck member results during subsequent cooling, with accompanying radial contraction and clamping of the cylindrical shank of the tool in the region of the central bore hole.

It is an object of the present invention to provide a chuck of the type indicated above which has an increased rate of expansion with accompanying larger widening of the clamping diameter, permitting greater tolerances for the shank of the tools to be clamped.

SUMMARY

The above and other beneficial objects of the present invention are achieved by providing a chuck as described herein.

Due to the configuration of the chuck according to the present invention, in response to the heating, the longitudinal section containing the central receptacle expands to a greater extent with increased rate of expansion, and the effective diameter for the expansion is greater. A larger widening of the clamping diameter results. This arrangement may provide the advantage that the shank tolerance for the tools to be clamped may be greater. Depending on circumstances, the application time and/or quantity of heat necessary for heating the longitudinal section of the chuck may also be reduced. Above all, the chuck is inexpensive and uncomplicated.

DETAILED DESCRIPTION

Figure 1:
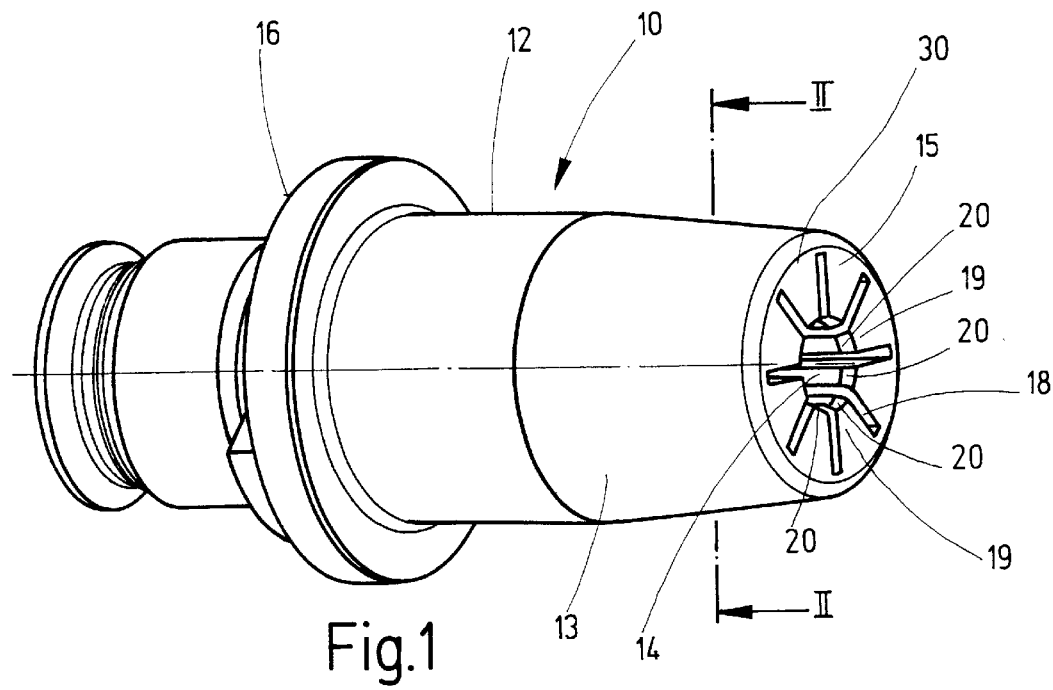
FIG. 1 is a schematic perspective view of a chuck without inserted tool according to a first example embodiment of the present invention.

Illustrated schematically in the Figures is a chuck 10 for the clamping of tools 11 by shrink fit, of which only shank 17 clamped in chuck 10 is illustrated. Chuck 10 includes a chuck member 12 which has a longitudinal section 13 having a central receptacle 14 that, as illustrated in FIG. 1, is open toward the end located to the right, and is used for inserting and holding tool 11 to be clamped with its shank 17. Contiguous to longitudinal section 13, chuck member 12 includes an end region 16 which is not significant for the invention and may be constructed as desired. Using this end region 16, chuck 10 is insertable in a conventional manner into, for example, a work spindle of a machine tool. Deviating from the representation, end region 16 may also be configured differently, depending on the structural conditions present on the spindle side. For example, it may also be constructed as a simple shank that is part of a chuck, or, with chuck member 12, is able on its part to be releasably inserted into a chuck that is able to be accommodated in the work spindle of a machine tool.

Inner receptacle 14, extending up to a flat contact surface 15, is used for inserting and holding tool 11 to be clamped with its cylindrical shank 17 in chuck member 12. In principle, tool 11 is arbitrary. It is made, for example, of a milling cutter, a drill bit, etc.

Figure 2:
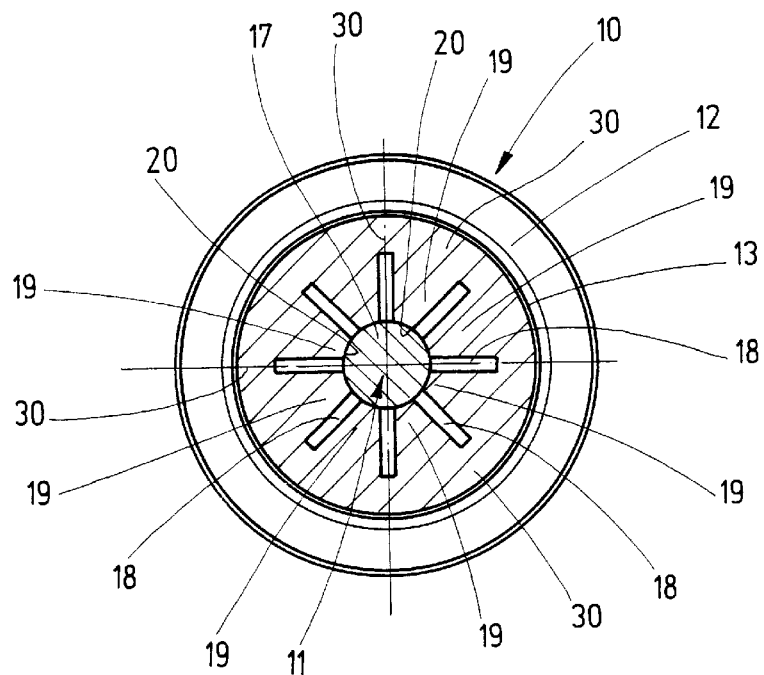
FIG. 2 is a schematic cross-sectional view of the chuck illustrated in FIG. 1 taken along the line II—II, with an inserted tool.

In the first example embodiment of the present invention illustrated in FIGS. 1 and 2, chuck member 12 represents a one-piece structure. In a special construction, longitudinal section 13 includes a plurality of segments 19 arranged at distances from one another in the circumferential direction and separated from one another by clearances 18 in between. In the example embodiment illustrated, a total of eight substantially identical segments 19 and clearances 18 in between are provided. Segments 19 extend essentially axially parallel and extend over a considerable axial length of receptacle 14 so that they form receptacle 14 and, with their respective inner peripheral areas 20, form the clamping surface for clamping shank 17.

Clearances 18 are open in the radial direction toward the inside of receptacle 14 and have a considerable depth in the radial direction. Viewed from inside to outside, they extend in the radial direction by a considerable measurement outwardly. Clearances 18 are formed by radial slits the width of which measured in the circumferential direction in the first example embodiment illustrated in FIGS. 1 and 2 is uniform in the radial direction. Accordingly, individual segments 19 in cross-section have the shape of ring segments. The arrangement is such that segments 19 and/or clearances 18 follow each other in the circumferential direction at approximately equal angle-at-circumference distances.

Longitudinal section 13 has a sleeve part 30 which surrounds segments 19 on the outside, viewed in the radial direction. This sleeve part 30 has a comparatively thinly-dimensioned wall cross-section having a high thermal expansion rate. In the first example embodiment illustrated in FIGS. 1 and 2, this sleeve part 30 is in one piece with segments 19, and is therefore of uniform material, as well Due to the configuration of the chuck according to the present invention, in response to heating for initiating the shrink clamping of tool 11, sleeve part 30 expands to a greater extent radially than is the case for conventional comparable chucks without segments 19 and clearances 18. The effective diameter for the expansion is larger. A greater widening of the clamping diameter of receptacle 14 may result, which means the tolerance of shanks 17 of tools 11 to be clamped may be greater. Decisive for the high thermal expansion rate achieved is the comparatively thinly-dimensioned wall cross-section of sleeve part 30 which is attained by relatively great radial depth of clearances 18 and the division into individual segments 19 by clearances 18 in between, so that sleeve part 30 theoretically yields a relatively narrow ring that extends around segments 19 in the circumferential direction, thus in one piece. Upon initiating the shrink clamping first of all by heating, essentially only this sleeve part 30 experiences a radial widening by expansion, and the diameter of receptacle 14 and the clamping diameter formed by inner peripheral areas 20 are thereby enlarged. Additionally, at the same time, relatively little heat flows off into segments 19, and from them to tool shank 17, so that depending on circumstances, the time for heating longitudinal section 13 and/or the quantity of heat to be introduced may be reduced.

Figure 3:
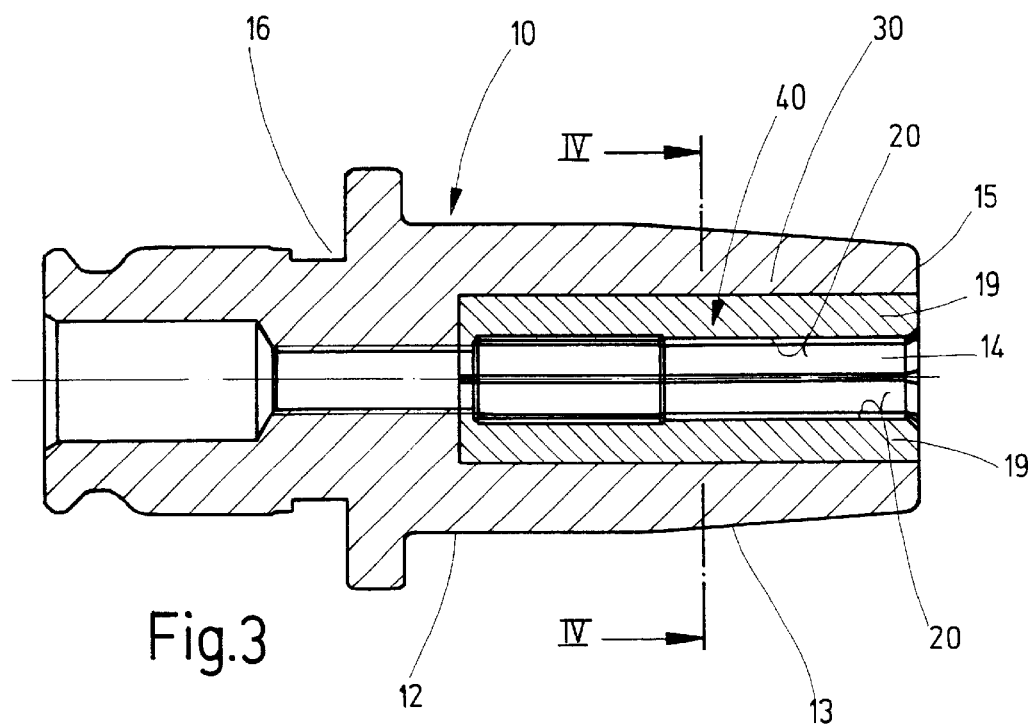
FIG. 3 is a schematic axial longitudinal cross-sectional view of a chuck according to a second example embodiment of the present invention.
Figure 4:
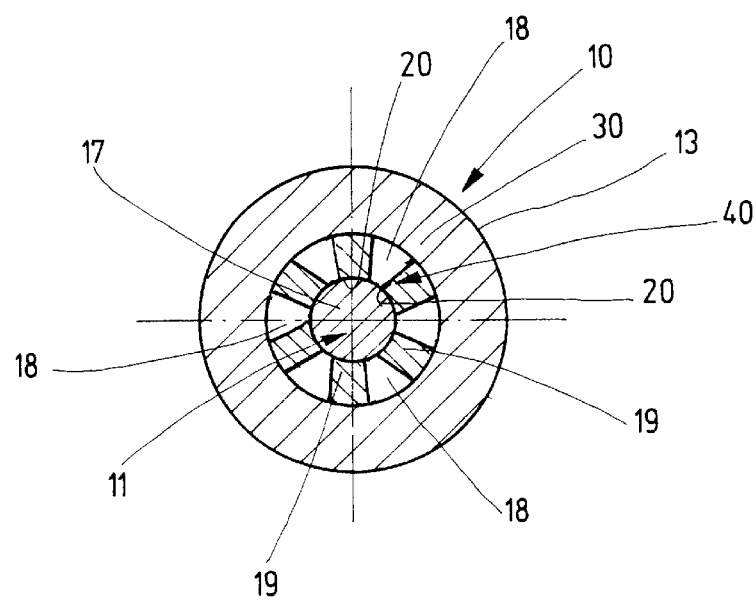
FIG. 4 is a schematic cross-sectional view of the chuck illustrated in FIG. 3 taken along the line IV—IV, with an inserted tool.

In the second example embodiment of the present invention illustrated in FIGS. 3 and 4, the same reference numerals are used for the parts which correspond to those of the first example embodiment, so that because of this, reference is made to the description of the first example embodiment in order to avoid repetitions.

Unlike the first example embodiment, chuck 10 according illustrated in FIGS. 3 and 4 is configured so that individual clearances 18 between segments 19 have a considerable width measured in the circumferential direction, clearances 18 indeed also being radial slits, but these slits enlarging in the radial direction, viewed from the inside to the outside. Individual segments 19 in cross-section have the shape of radially aligned rectangular parallelepipeds.

In the second example embodiment, segments 19 are part of a special insert 40 which is inserted into longitudinal section 13 of chuck member 12 from the end located to the right in FIG. 3. Sleeve part 30 surrounding segments 19 is an integral part of longitudinal section 13, while in contrast, segments 19 as components of insert 40 represent independent structural elements. Insert 40 may be made of a different material than sleeve part 30, and thus than longitudinal section 13 of chuck member 12. For example, insert 40 may be formed from a material having lower thermal conductivity than sleeve part 30. This arrangement may provide the advantage that during the heating for initiating the shrink clamping, the heat remains in sleeve part 30 to the greatest extent possible, and does not, for example, flow off into segments 19 due to thermal conduction, and from them to shank 17 of tool 11. Insert 40 may be formed from a material having a low coefficient of thermal expansion. This arrangement may provide the advantage that when heating sleeve part 30, its high thermal expansion rate is fully utilized, and in the inner area which is formed by insert 40, only a slight thermal expansion occurs. In the second example embodiment, clearances 18 between segments 19 of insert 40 are open in the radial direction both outwardly and inwardly toward receptacle 14. Insert 40 may be fixedly joined to sleeve part 30, e.g. by soldering. As illustrated in FIG. 3, segments 19 and the clamping surfaces formed at their inner peripheral areas 20 extend over a considerable axial length, so that even longer shanks 17 may be reliably clamped by shrink clamping, in so far as this is necessary. In both example embodiments of chuck 10, a tool 11 is shrink-clamped by first of all heating chuck 10 on the peripheral side in the area of longitudinal section 13, tool 11 being introduced with shank 17 into receptacle 14, since because of the heating, the diameter effective for the clamping enlarges due to the great thermal expansion rate of sleeve part 30 with relatively large widening of the clamping diameter, so that tools 11 having greater tolerances with respect to the diameter of shank 17 may be clamped. The part of longitudinal section 13 decisive for the clamping is subsequently cooled, with associated shrinkage, accompanied by radial clamping of shank 17 within receptacle 14.

What is claimed is:

1. A chuck for clamping a tool by shrink fit, comprising:
   a chuck member having a longitudinal section, the longitudinal section including a central receptacle having a clamping surface configured to receive and hold a shank of the tool to be clamped;
   wherein the longitudinal section includes a plurality of segments arranged at distances from one another in a circumferential direction and separated from each other by clearances in between, the segments extending essentially axially parallel, an inner peripheral area of the segments forming the clamping surface, each clearance having a depth in a radial direction that is at least half of a wall thickness of the longitudinal section.

2. The chuck according to claim 1, wherein the clearances are open toward the receptacle in a radial direction.

3. The chuck according to claim 1, wherein the clearances between the segments have a considerable width in the circumferential direction.

4. The chuck according to claim 1, wherein a cross-section of the segments has a ring segment shape.

5. The chuck according to claim 1, wherein the clearances are formed by radial slits.

6. The chuck according to claim 5, wherein the radial slits are dimensioned with a uniform width in a radial direction.

7. The chuck according to claim 1, wherein at least one of the segments and the clearances follow each other in the circumferential direction at approximately equal angle-at-circumference distances.

8. The chuck according to claim 1, further comprising a sleeve part surrounding the segments on an outside in a radial direction.

9. The chuck according to claim 8, wherein the sleeve part has a thinly-dimensioned wall cross-section relative to the longitudinal section.

10. The chuck according to claim 8, wherein the sleeve part is integral with the segments and forms the longitudinal section of the chuck member.

11. The chuck according to claim 8, wherein the segments are part of an insert inserted into the sleeve part of the chuck member.

12. The chuck according to claim 11, wherein the insert is fixedly joined to the sleeve part.

13. The chuck according to claim 12, wherein the insert is fixedly joined to the sleeve part by soldering.

14. The chuck according to claim 11, wherein the clearances between the segments of the insert are open in the radial direction inwardly and outwardly toward the receptacle.

15. A chuck for clamping a tool by shrink fit, comprising:
a chuck member having a longitudinal section, the longitudinal section including a central receptacle having a clamping surface configured to receive and hold a shank of the tool to be clamped;
wherein the longitudinal section includes a plurality of segments arranged at distances from one another in a circumferential direction and separated from each other by clearances in between, the segments extending essentially axially parallel, an inner peripheral area of the segments forming the clamping surface; and
wherein a cross-section of the segments has a shape of radially-aligned rectangular parallelepipeds.

16. A chuck for clamping a tool by shrink fit, comprising:
a chuck member having a longitudinal section, the longitudinal section including a central receptacle having a clamping surface configured to receive and hold a shank of the tool to be clamped;
wherein the longitudinal section includes a plurality of segments arranged at distances from one another in a circumferential direction and separated from each other by clearances in between, the segments extending essentially axially parallel, an inner peripheral area of the segments forming the clamping surface;
wherein the clearances are formed by radial slits; and
wherein the radial slits enlarge in a radial direction from an inside to an outside.

17. A chuck for clamping a tool by shrink fit, comprising:
a chuck member having a longitudinal section, the longitudinal section including a central receptacle having a clamping surface configured to receive and hold a shank of the tool to be clamped, the longitudinal section including a plurality of segments arranged at distances from one another in a circumferential direction and separated from each other by clearances in between, the segments extending essentially axially parallel, an inner peripheral area of the segments forming the clamping surface; and
a sleeve part surrounding the segments on an outside in a radial direction;
wherein the segments are part of an insert inserted into the sleeve part of the chuck member; and
wherein the insert is formed from a different material than the sleeve part.

18. A chuck for clamping a tool by shrink fit, comprising:
a chuck member having a longitudinal section, the longitudinal section including a central receptacle having a clamping surface configured to receive and hold a shank of the tool to be clamped, the longitudinal section including a plurality of segments arranged at distances from one another in a circumferential direction and separated from each other by clearances in between, the segments extending essentially axially parallel, an inner peripheral area of the segments forming the clamping surface; and
a sleeve part surrounding the segments on an outside in a radial direction;
wherein the segments are part of an insert inserted into the sleeve part of the chuck member; and
wherein the insert is formed from a material having a low thermal conductivity.

19. A chuck for clamping a tool by shrink fit, comprising:
a chuck member having a longitudinal section, the longitudinal section including a central receptacle having a clamping surface configured to receive and hold a shank of the tool to be clamped, the longitudinal section including a plurality of segments arranged at distances from one another in a circumferential direction and separated from each other by clearances in between, the segments extending essentially axially parallel, an inner peripheral area of the segments forming the clamping surface; and
a sleeve part surrounding the segments on an outside in a radial direction;
wherein the segments are part of an insert inserted into the sleeve part of the chuck member; and
wherein the insert is formed from a material having a low coefficient of thermal expansion.

* * * * *